United States Patent
Butz et al.

(10) Patent No.: US 11,691,086 B2
(45) Date of Patent: Jul. 4, 2023

(54) HATER PLAYER POOL FANTASY SPORTS

(71) Applicant: Hater Fantasy Sports, Inc., Haddonfield, NJ (US)

(72) Inventors: Eric L. Butz, Newfield, NJ (US); David Vadurro, Stratford, NJ (US)

(73) Assignee: Hater Fantasy Sports, Inc., Haddonfield, NJ (US)

( * ) Notice: Subject to any disclaimer, the term of this patent is extended or adjusted under 35 U.S.C. 154(b) by 0 days.

(21) Appl. No.: 17/019,069

(22) Filed: Sep. 11, 2020

(65) Prior Publication Data
US 2021/0077909 A1   Mar. 18, 2021

Related U.S. Application Data

(60) Provisional application No. 62/900,414, filed on Sep. 13, 2019.

(51) Int. Cl.
*A63F 13/828*   (2014.01)
*A63F 13/46*   (2014.01)

(52) U.S. Cl.
CPC ............ *A63F 13/828* (2014.09); *A63F 13/46* (2014.09)

(58) Field of Classification Search
CPC .................................. A63F 13/828; A63F 13/46
See application file for complete search history.

(56) References Cited

U.S. PATENT DOCUMENTS

| | | | | |
|---|---|---|---|---|
| 2008/0287198 A1* | 11/2008 | Callery | ................... | G07F 17/32 463/42 |
| 2014/0011573 A1* | 1/2014 | Amaitis | .............. | G07F 17/3288 463/25 |
| 2017/0113147 A1* | 4/2017 | Lukasik | .............. | G07F 17/3288 |

OTHER PUBLICATIONS

HalaPlay Technologies Pvt Ltd. (Mar. 2, 2018). How to play Reverse Fantasy Leagues? Halaplay Guide. https://play.halaplay.com/2018/03/02/what-is-reverse-fantasy/. Accessed Dec. 9, 2020. 2 pages.

Schatz, A. (Sep. 15, 2015). Site News: Loser League 2015 is Here! Football Outsiders. https://www.footballoutsiders.com/extra-points/2015/site-news-loser-league-2015-here. Accessed Dec. 9, 2020. 5 pages.

Suck League—Reverse Fantasy Football / Negative Fantasy Football (2020). Rulebook. Internet Archive. https://web.archive.org/web/20200926053608/http://suckleague.com/rulebook/. Accessed Dec. 9, 2020. 5 pages.

Victor, T. (Sep. 10, 2020). Fewest Points Wins: The Fantasy Football league with a difference. https://www.planetfootball.com/quick-reads/fewest-points-wins-the-fantasy-football-league-with-a-difference/. Accessed Dec. 9, 2020. 6 pages.

\* cited by examiner

*Primary Examiner* — Thomas H Henry
(74) *Attorney, Agent, or Firm* — Mintz, Levin, Cohn, Ferris, Glovsky and Popeo, P.C.; F. Jason Far-hadian, Esq.

(57) ABSTRACT

A computer-implemented fantasy sports game is provided in which a selection of player choices is submitted by one or more participants in association with one or more games scheduled according to a real-life sports game period. The selection of choices may include one or more virtual players selected for a game roster or a team by a participant. Statistically calculated performance ratings may be assigned to the selected virtual players and a total score may be computed for the participating teams based on the assigned performance ratings. One or more participants with worst scoring teams may be rewarded with proceeds contributed by other fantasy sports participants.

13 Claims, 7 Drawing Sheets

Standard Positions

| | | | |
|---|---|---|---|
| Quarter Back | Passing Yards | Rushing Yards | TD's Pass or Rush | Bonuses: Multiple to movers / 5 TD's / < 200 Passing Yards / <5 Rush Yards / <60% Completions / < 15 Completions |
| Running Back | Rushing Yards | Passing Yards | TD's Rush or Recieve | Bonuses: Multiple to movers / < 50 Yards / < 5 Carries |
| Wide Receiver | Receiving Yards | Rushing Yards | TD's Recieve or Rush | Bonuses: Multiple to movers / < 40 Yards / < 1 Receptions |
| Tight End | Receiving Yards | Rushing Yards | TD's Recieve or Rush | Bonuses: Multiple to movers / < 30 Yards / 1 Receptions |
| Defense (Team) | Total Yards Allowed | Totals Points Allowed | | Bonuses: > 500 Total Yards Allowed / > 30 pts allow |
| Kickers | Field Goals Made | Extra Points Made | | Bonuses: Extra Point Missed / Multiple Extra Points / 35 Yards Field Goals Missed |

League of Gone Add on $

| | | | |
|---|---|---|---|
| Coach | Performance Against Point Spread | | | Bonuses: Doubling Point Spread / Score < 10 pts |
| Punter | Net Yards | Inside 20 | | Bonuses: 1 Points Inside 20 Yards |
| Offensive Line | Rush Yards Allowed | Sacks Allowed | | Bonuses: 4+ Sacks allowed / > 100 Yards Rushing Allowed |
| Special Teams | Net Yards | Turnovers | | Bonuses: Multiple TD's/TD's Allowed (Touchdowns) Turnovers |
| D Lineman | -Sacks/Tackles -Interceptions | -Forced Fumbles -Fumble recover | | TBD? |
| Linebacker | -Sacks/Tackles -Interceptions | -Forced Fumbles -Fumble recover | | TBD? |
| Defensive Back | -Sacks/Tack Out | -Forced -Recovered | | TBD? |

*FIG. 4*

| Quarterback | Passing Yards | Rushing Yards | Points Scored |
| Running Back | Catch Yardage | Rushing Yards | Points Scored |
| Wide Receiver | Catch Yardage | Rushing Yards | Points Scored |
| Tight End | Catch Yardage | Rushing Yards | Points Scored |
| Kicker | | | Points Scored |

HATER PLAYER POOL FANTASY SPORTS

CROSS-REFERENCE TO RELATED APPLICATIONS

This application claims the benefit of priority to earlier filed U.S. Provisional Application Ser. No. 62/900,414 filed on Sep. 13, 2019, the content of which is hereby incorporated herein by reference in entirety.

TECHNICAL FIELD

The subject matter described herein relates to virtual game pools for sports fans, and more particularly to computer-implemented on-line competitive fantasy sports games in which a plurality of participants compete by way of selecting real-life players for virtual sports teams.

BACKGROUND

Fantasy sports games include contests that allow sports enthusiasts to act as the owner or manager of a virtual or so-called fantasy sports team. Depending on implementation, a fantasy sports participant may build a fantasy team that includes a number of real-life players from known sports teams. The fantasy team competes against other fantasy teams based on statistics generated by the real individual players and teams in professional, collegiate or amateur sports.

Typically, fantasy sports teams are selected based on the users' knowledge of individual players and how the players are expected to perform. Once a fantasy sports team is selected, the combined success results for all players on the team is determined and the teams that have the best performance are declared winners. Many sports fans enjoy the bragging rights and the competitive nature of the fantasy sports games and hope for the best outcome in terms of their selected team successfully beating the other fantasy teams.

While most sports fans have favorite players whom they wish to see succeed, some sports fans can also be emotionally adverse to the success of certain players. That is, some sports fans may like to see certain players fail. No fantasy sports game is available that can accommodate such need. As such, a fantasy sports game is desirable that offers sports fans hostile to certain players or teams with the possibility to select a group of disliked players into a reverse-fantasy team with the premise that the selected team will be the worst performer.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, computer-implemented methods, articles and systems for fantasy sport participation are provided. The method comprises receiving, at a server comprising at least one processor, a selection by a fantasy sports participant of a fantasy roster for a first game period, the fantasy roster comprising one or more selected real players selected by the fantasy sports participant from a pool of eligible real players who are eligible for use by the fantasy sports participant during the first game period; recording statistics representative of performance of the selected real players during the first game period; adjusting a total season score for the fantasy sports participant based on the recorded statistics; and awarding a fantasy roster from among a plurality of fantasy rosters that has had the worst performance.

In certain embodiments, a computer-implemented game method comprises receiving, through a user interface, a selection of choices submitted by a user in association with a first game period scheduled according to a real-life sports game period, the selection of choices including one or more virtual players selected for a game roster from among a plurality of virtual players, the plurality of virtual players being respectively associate with a plurality of real-life players included in a pool of players participating in real-life sports games during the first game period. Performance ratings may be assigned to the selected virtual players based on statistical analysis of performance data available for the corresponding real-life players during the first game period.

A total score may be computed for the user based on the assigned performance ratings for the selected virtual players for the duration of the first game period. The user may be rewarded with proceeds collected from a plurality of other users participating in the game, in response to determining that the computed total score for the user indicates that the user's roster of virtual players was one of the worst performers from among other users' rosters of virtual players. The pool of players participating in the real-life sports games during the first game period includes a number of real-life players who play a first sports position in a team sport upon which the first game period is based.

The number of real-life players may be greater than a total number of game periods in a game season. The computing of the total score comprises adjusting the score based on real-time events associated with the real-time players. The computing of the total score comprises adjusting the total score based on critical factors selected by the user. The real-time events include at least one of penalties, injuries, bad plays, or other miscues associated with the corresponding real-life players. The critical factors include association of the corresponding real-life players with a real-life coach being identified as a sub-optimal performer, or the number of missed points by the corresponding real-life players.

In response to determining that a first user has a tied score with a second user, a tiebreaker procedure is invoked. The tiebreaker procedure comprises rewarding the first user and the second user with an amount equal to the average value of the sum of a first ranking reward and a second ranking reward. The user is allocated a maximum salary amount when selecting the one or more virtual players for the game roster, such that sum of salaries associated with the selected virtual players is less than or equal to the maximum salary amount.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, a fantasy sports league may be organized or structured in which fantasy league participants select players for their active team roster from some or all of the real players in a real sports league or conference, upon which the fantasy sports league is based. Each real player is assigned a salary number based on that real player's performance. A fantasy sports participant may be given a fixed amount that can be spent on the total salary for the real players in the fantasy sports team selected.

Depending on implementation, if a real player's performance improves during the season, the salary value assigned to that player can decrease. Vice versa, if a real player's performance does not improve or degrades, or if the player gets injured, then the salary value assigned to the player is increased. In this way, to choose the worse players in the league, a sports fantasy participant will have to pay a higher salary. In certain embodiments, depending on the amount of adjustment in the salary value of a player, the fantasy sports participant may choose to exchange one or more players for one or more other players with a comparable total salary in order to be able to meet the assigned salary cap. A fantasy sports participant is thus given the option to increase or reduce the total salary for the team by trading players that have experienced a recent adjustment in salary value.

Figure 1:
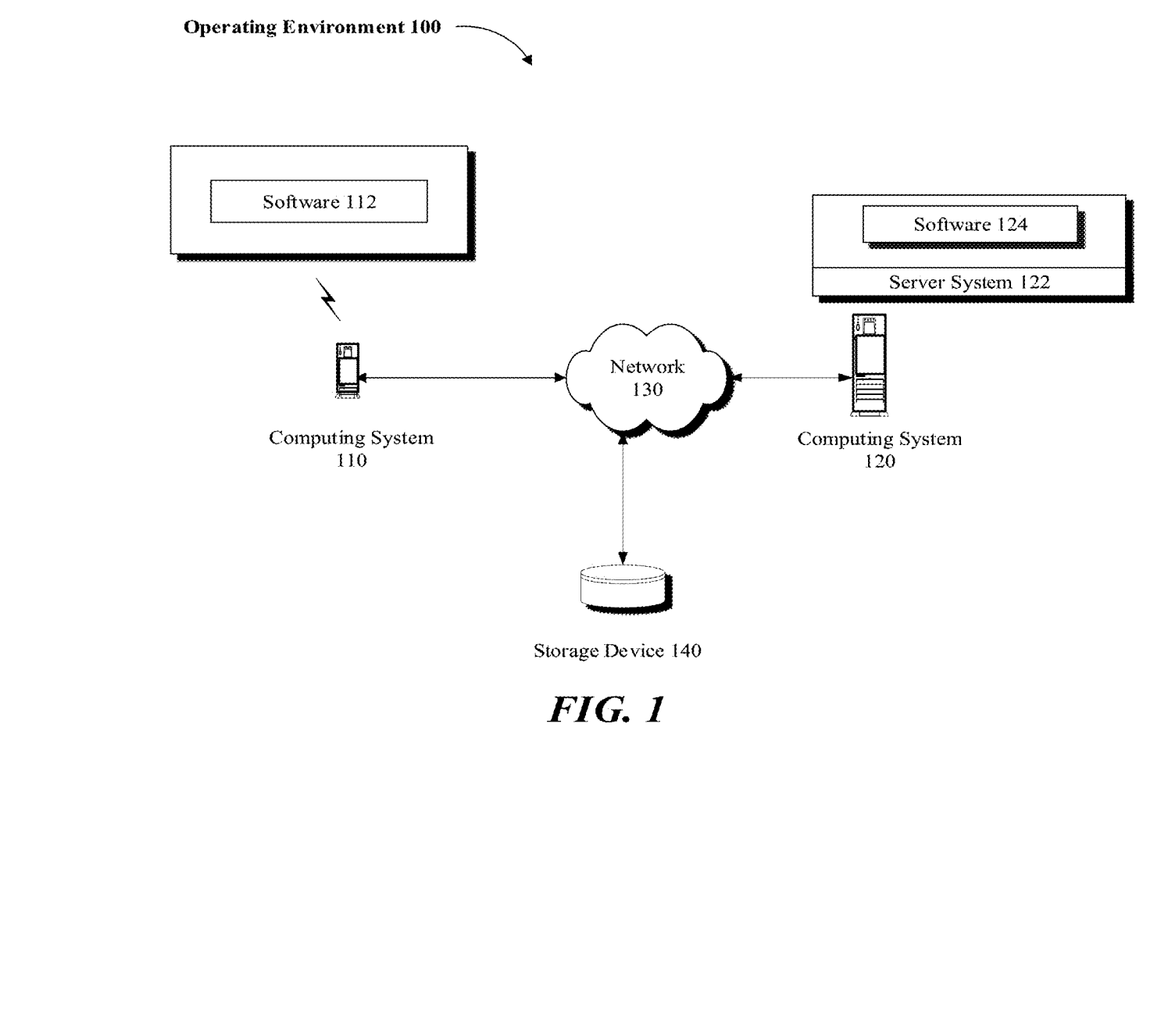
FIG. 1 illustrates an example operating environment in accordance with one or more embodiments, wherein a fantasy sports game is implemented.

Referring to FIG. 1, an example operating environment 100 is illustrated in which a computing system 110 may be used by a user to interact with fantasy sport software 112 being executed on computing system 110. The computing system 110 may be a general-purpose computer, a handheld mobile device (e.g., a smart phone), a tablet (e.g., an Apple iPad®), or other communication capable computing device. Software 112 may be a web browser, a dedicated app or other type of software application running either fully or partially on computing system 110. Certain embodiments may incorporate virtual environments and utilize virtual reality devices (e.g., three-dimensional (3D) video and touch-activated interfaces) to provide a user with an immersive fully interactive experience.

Computing system 110 may communicate over a network 130 to access data stored on storage device 140 or to access services provided by a computing system 120. Depending on implementation, storage device 140 may be local to, remote to, or embedded in one or more of computing systems 110 or 120. A server system 122 may be configured on computing system 120 to service one or more requests submitted by computing system 110 or software 112 (e.g., client systems) via network 130. Network 130 may be implemented over a local or wide area network (e.g., the Internet).

Computing system 120 and server system 122 may be implemented over a centralized or distributed (e.g., cloud-based) computing environment as dedicated resources or may be configured as virtual machines that define shared processing or storage resources. Execution, implementation or instantiation of software 124, or the related features and components (e.g., software objects), over server system 122 may also define a special purpose machine that provides remotely situated client systems, such as computing system 110 or software 112, with access to a variety of data and services as provided below.

In accordance with one or more implementations, the provided services by the special purpose machine or software 124 may include providing a user, using computing system 110 or software 112, with the ability to select one or more players to be added to a virtual team that competes with virtual teams selected by other users. As provided in further detail below, the objective for selecting a team of players, in accordance with one or more embodiments, is to build a virtual team that will be least successful and ultimately ranked as the worst team among all the other virtual teams.

According to one aspect, statistics accumulated by real players on the active roster of a fantasy sports participant are tabulated according to a defined scoring system, which can in some implementations be based on fantasy points given in a pooling system. The tabulated statistics are used to compare and rank the fantasy sports participants in the fantasy league. The season may be divided into a number of scoring periods. During a scoring period, a fantasy sports participant may select a roster having a number of real players at positions according to roster limits set by the fantasy league rules.

The fantasy sports participant can select a player from a pool of available real players for each position in the team roster. In at least one embodiment, after each scoring period, the pool of available real players for each fantasy sports participant may be updated. A fantasy sports participant may strive to use a real player during the scoring period when the real player has the worst statistical output of the season.

In accordance with example embodiments, fantasy league participant scores can be based on a conversion of various scoring and statistical performances of real athletes or competitors into fantasy points. Alternatively, the statistics accumulated by the real players on a fantasy league participant's roster during the scoring periods in a season can be aggregated and ranked against the performance of the rosters of other fantasy league participants according to a Rotisserie-style scoring system, for example.

In an implementation in which real player rankings are performed for statistical categories as in a Rotisserie-style scoring format, one or more of that statistics that are ranked can be a value other than an absolute number. For example, in the case of a baseball fantasy league, one or more of batting average, earned run average, on base percentage, slugging percentage, win loss percentage or the like can be used. As another example, in the case of a basketball fantasy league, at least one or more of shooting percentage, free throw percentage, points per minute played, rebound per game, and the like can be used in a basketball league.

Figure 2:
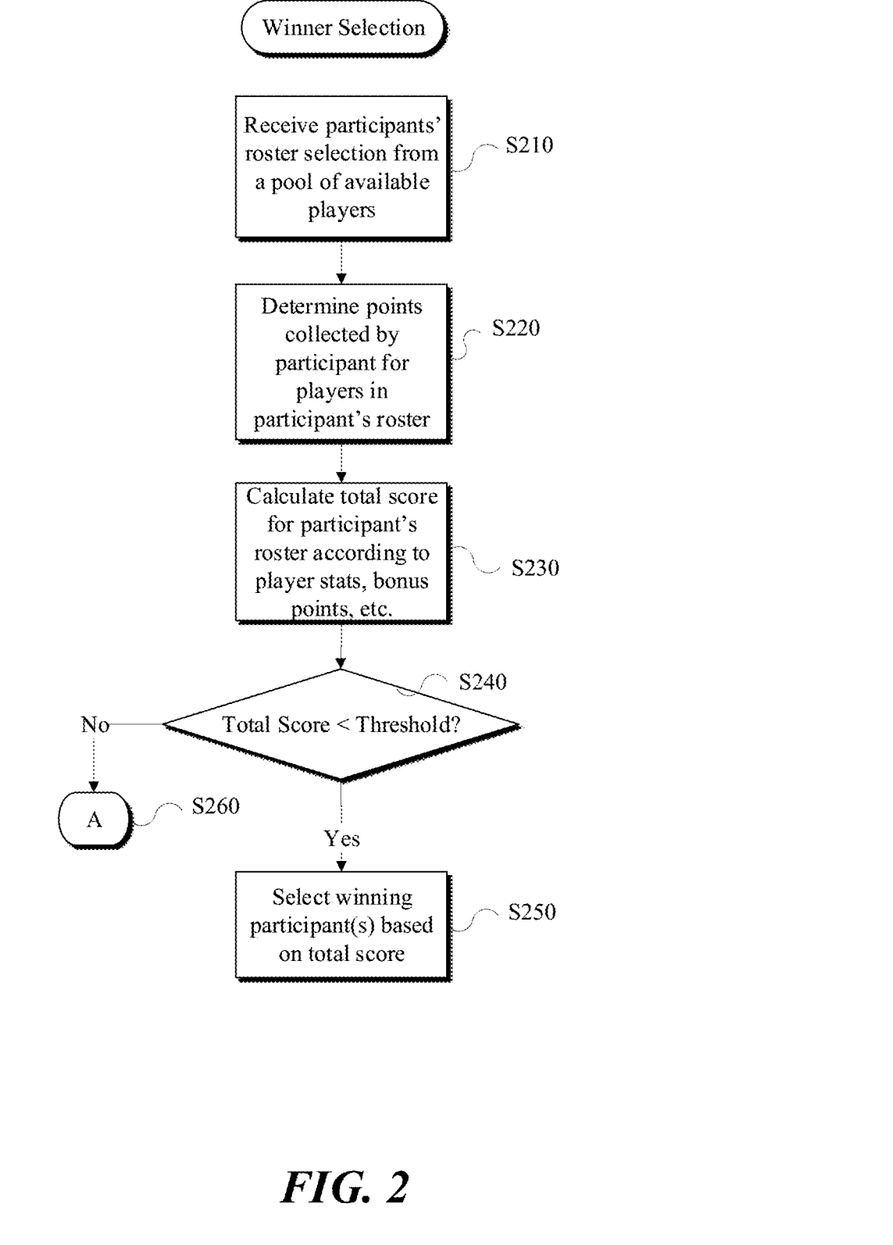
FIG. 2 is an example flow diagram of a method of selecting a winner among the fantasy sports participants, in accordance with one embodiment.

Referring to FIG. 2, a process flow diagram is provided that illustrates various features of a method for a hater pool fantasy sports game. As shown, in FIGS. 1 and 2, a computing system 110 may be configured to receive a selection of a fantasy sports participant's player roster from a pool of available players (S210). In one aspect, the fantasy sports participant's player roster is selected from the fantasy sports participant's eligible player pool for a first game period using a graphical user interface. The graphical user interface may have features such as those illustrated in FIG. 6, for example.

Player statistics may be recorded for real players for games that are played during a game period. Based on these statistics, a score or a number of points collected by a game participant for various players in the participant's roster may be determined or calculated (S220). Based on the points determined for individual players, a total score for the participant's roster may be calculated, taking into account player statistics, bonus points, etc. (S230). Depending on implementation, the participant that has the worst performing team (e.g., if the participant's total score is below a threshold or lower than all the other participants in the hater fantasy game) is selected as the winner (S240, S250). Otherwise, the participant may be ranked and listed based on the total score (S260).

In an alternative approach, the winner may be the participant who gets the highest score, where a higher statistical score is indicative of a poor performance. In other words, the scoring and score calculation may be implemented in various ways without detracting from the scope and spirit of the subject matter disclosed herein. Ultimately, the score is indicative of how bad a roster of individual players has performed, where the roster that has performed the worst is selected as the winner. The participant that has selected the worst performing roster of players is entitled to win a prize associated with his participation in the fantasy league game. The prizes can be in the form of cash, physical prizes, entries into a subsequent tournament, a trophy, credits for future events, or the like.

For sports in which real players have designated positions, the fantasy league rules can specify a number of real players that must be used on the fantasy sports participant's active roster for each game period. For example, in an implementation based on American football, the fantasy league rules could specify an active roster requirement of some set number of quarterbacks, running backs, wide receivers, tight ends, and kickers. Scoring by defensive and special team players can also be added. In one example, a football fantasy league may have an active roster requirement of one quarterback, two running backs, two wide receivers, and a kicker. The team may be ranked according to how bad the players on the team perform during the season. One objective may be to select players with a poor performance, where scoring points can be awarded for player miscues. Such miscues can include interceptions thrown, fumbles lost, times sacked, times tackled for a loss, dropped passes, rush attempts for negative yards, penalties received, missed field goals, and the like. For example, points may be awarded to a team with players that fumble the ball or a quarterback with intercepted throws.

In one implementation, a survivor player pool fantasy sports game can be offered in conjunction with a real American football league, such as the National Football League™ (NFL) or one or more National Collegiate Athletic Association (NCAA) conferences or divisions. During a scorring period (e.g., a day, a week, a month, etc.) in the football season or in other sports such as baseball a day, a fantasy sports participant in a fantasy league may select specific players for each position from a pool of real players. The pool of real players available at a position is defined before the season begins. In one embodiment, a real player in the pool of real players can be used by a fantasy sports participant only once during the season.

Depending on implementation, multiple fantasy sports participants may be selected in the same league to use the same real athlete or competitor on their roster at the same time. In the embodiments in which a real player can be used once during the season, strategy in choosing when to use each specific real player becomes important. Maximization of the points scored by a fantasy league team during the season involves predicting when a real player is likely to have his or her worst performance. For example, the real player may have one or more real game match-ups versus an opponent or opponents against whom the real player is expected not to perform well.

In some embodiments, an upper limit is not defined for the number of fantasy sports participants who can participate. As such, a real player can appear on any number of fantasy sports participant's rosters during the same scoring period subject to the limitation that the real player can be used during only one scoring period of the season by each fantasy sports participant. Accordingly, a fantasy league participant's success is determined by his or her ability to correctly identify not merely the worst real players or competitors, but rather those real players or competitors who are likely to have their worst statistical performance in one or more scoring periods.

To optimize his or her score, a fantasy league participant might examine the schedule of opponents that a given real player or competitor is to face during the season and decide which opponent is most likely to result in the desirable statistical output by that real player or competitor. In some scoring periods, a fantasy league participant might choose to use a real player or competitor who has performed bad statistically throughout the season and who is expected to produce bad season-long statistical performances.

In one implementation, a fantasy sports participant can be given one or more opportunities to re-use a real player during the course of the season. A fantasy league can include an opportunity for one or more fantasy sports participants who did not join the league in time to start at the beginning of the season to join a league after the season has begun. A fantasy sports participant who joins the league subsequent to the beginning of the season can optionally be eligible for both the full season and a second chance season prizes, as can a fantasy sports participant who joins the league at the beginning of the season. In one example, scores or prizes awarded in the league can be assigned to fantasy sports participants based on how bad the team's performance was compared to others.

Figure 3:
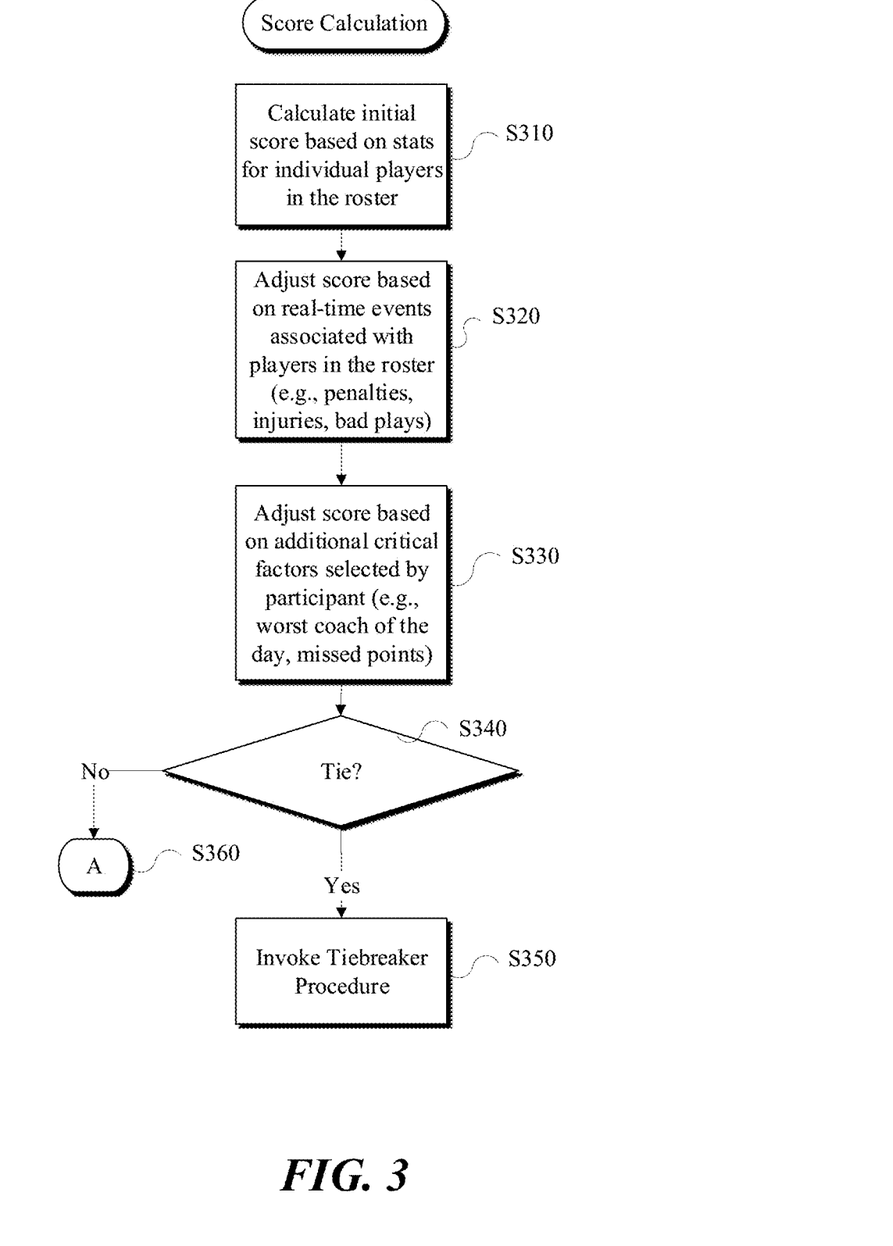
FIG. 3 is an example flow diagram of a method of calculating a score for a team of players selected by a fantasy sports participant, in accordance with one embodiment.

Referring to FIG. 3, the score calculated for a participant's team may be adjusted according to certain factors. For example, an initial score based on the statistics for individual players in the roster may be calculated (S310). The score may be adjusted based on real-time events associated with players in the roster (S320). Such real-time events may include, without limitation, penalties, injuries, bad plays, or other miscues or bad plays by the individual players on the participant's roster. Furthermore, in certain embodiments, the total score for the team may be adjusted based on additional critical factors selected by the participant (S330). Such factors may include, for example, selection of the worse coach for a particular period (e.g., number of losses for the coach's team over one or more calendar days), or the number of points missed by a player on the team's roster.

In one embodiment, the participant is awarded the most points based on bad plays or other miscues of the individual players. In contrast, teams with players that perform well (e.g., score more yards and more touchdowns) are awarded less points. Points can be awarded based on individual performances, with more points being awarded for poor performances (e.g., less yards gained means more points, no touchdowns made or thrown is awarded more points than a player that throws or makes a touchdown). Thus, a participant seeks the least amount of total points in order to win. In this embodiment, the participant is awarded a score based on the player's yards, touchdowns, receptions, field goals, and other positive efforts. Bad plays and other miscues subtract from those points.

In other words, if a player plays and has a very bad game, the participant is awarded few points (or negative points), making it more likely the participant wins. If the player has a good game, the participant is awarded more points, making it more likely the participant loses. After all the games for that scoring period are finished, the participant with the lowest total score for all his/her players would be the winner. Alternatively, the participants can be in a league (such as a 10, 12, or 14 participant league) and each week the participant plays another participant head-to-head, with the participant scoring the least points being the winner for that week and preferably advancing to the next week or next game. The season can have a regular season, with the top participants in the league then have a playoff to determine the league winner.

At a predetermined time period (e.g., at the end of a sports season), the fantasy sports participants in the league may be ranked according to the total statistics and/or fantasy points accumulated by the active roster selected by the fantasy sports participant. In one example, a first place, a second place, and a third place prize are awarded to the first, second, and third place worst performers, respectively. In the event that two or more fantasy sports participants end in a tie (S340), a tiebreaker procedure may be invoked (S350). Alternatively, the prize can be split between the two or more fantasy sports participants (S360).

In one example, if two fantasy sports participants were to tie for first place, the first and second place prizes could be combined and split between the two fantasy sports participants. Similarly, in a two-way tie for second place in a fantasy league in which there is a third place prize, the second and third place prizes could be combined and split between the two fantasy sports participants in the tie for second. In general, in a tie between fantasy sports participants, the prizes for the number of prize places that the fantasy sports participants would have received had they not been tied are combined and split evenly among the tied fantasy sports participants.

If there are more fantasy sports participants tied than there are prize places (for example in a two-way tie for third when third place is the lowest place to receive a prize), the available prize or prizes are divided between the tied fantasy sports participants. In one aspect, a tie between two or more fantasy sports participants can be broken to determine a single winner of each prize. Various tie-breaking procedures can be used. For example, the fantasy sports participant in the tie who attained the highest score or best statistics in a single scoring period can be awarded the higher available prize. Other options for breaking a tie can be used as well.

The following provides an example process for playing a hater fantasy sport as applied to a baseball game and a football game:

Login to Hater Fantasy Sports

Choose an active game—a salary cap may be enforced for each user, but the user does not have to use all the salary cap money.

Baseball: Select one of each of the following players: pitcher, catcher, first baseman, 2nd baseman, 3rd baseman, shortstop, and three outfielders.

Football: Select one of each of the following players: one quarterback, two running backs, three wide receivers, one tight end, one defense, one kicker.

Select a "lineup confirmed" option.

Once the lineup is confirmed, a notice is provided and the team is entered in that game's queue.

In a baseball fantasy league, the fantasy league participant whose roster has accumulated the least homeruns could receive the highest (or lowest depending on implementation) score in the homerun category, while the fantasy league participant with the second lowest homeruns receives the next highest (or lowest) score. The total numbers of hits, walks, strikeouts, stolen bases, runs batted in (RBI), runs scored, etc. can likewise be tallied for each fantasy league participant in a baseball fantasy league and rankings in each category compiled.

An example of an active roster requirement for a baseball league includes one position player at each position (for example a catcher, first baseman, second baseman, shortstop, third baseman, left fielder, center fielder, and right fielder), and one or more starting pitchers and relief pitchers (for example four starting pitchers and two relief pitchers). Outfielders can optionally be grouped as a single position so that a fantasy sports participant can fill his or her roster by selecting any three outfielders.

Scoring periods can be determined as individual calendar weeks of the regular season or by some other method for grouping games into scoring periods. An available player pool can include a number of players at each position that is greater than or equal to the number of scoring periods in the season multiplied by the number of real players at that position that must be used in each scoring period. Again, the goal will be to choose players that perform poorly.

For basketball, one or more of points, rebounds, assists, steals, blocked shots, turnovers, and the like can be used as scoring categories. An active roster can include a center, two forwards, and two guards. Other variations are possible. For example, an active roster can include one or more additional players such as a "sixth man" or bench player. Scoring periods can be determined as individual calendar weeks of the regular season or by some other method for grouping games into scoring periods. An available player pool can include a number of players at each position that is greater than or equal to the number of scoring periods in the season multiplied by the number of real players at that position that must be used in each scoring period, trying to choose players that perform poorly. Fantasy leagues for soccer and hockey can use statistics such as saves, goals, and assists to determine scoring. An example of an active roster requirement for soccer could include a goalie, three defenders, three midfielders, and four forwards. In hockey, an example of a roster could include a goalie, two defenders, and three forwards.

In some embodiments, the principles and processes disclosed herein may be applied to any sport, game or racing activity in which one or more individuals or teams compete. Examples of such activities include, without limitation, motorcycle, drone or automobile racing (e.g., NASCAR, Indy car, Formula One, etc.), horse (or other animal) races or competitions, golf, fishing, boxing, mixed martial arts, bowling, tennis, and the like. If the real players or competitors do not play different positions that can be used in assembling a fantasy sports roster, the real players can be grouped into two or more tiers. For a scoring period in the season, a fantasy sports participant selects a set number of real players from each tier to create his or her active roster for that period.

Scoring periods can be determined to conveniently divide a sports season. For example, in golf, tennis, auto racing, fishing, bowling, and other sports that feature periodic tournaments, races or other competitions, each tournament, race, or other competition can be a scoring period. If a season has twenty scoring periods, in one example, the top twenty players by ranking at the end of the previous season could be grouped into a first tier, the next twenty could be grouped into a second tier, the third twenty into a third tier, and so on. For a scoring period, a fantasy sports participant fills out a "roster" by selecting one real player from a tier. Different configurations of a tier system are within the scope of the disclosed subject matter.

For sports that have extremely long seasons, the season can be divided into two or more fantasy sports seasons. The pool of available players for each fantasy sports participant can be reset to the full pool at the start of each fantasy sports season. In this manner, a fantasy sports participant would not be limited to using a particular competitor only once per year. In one example based on the NASCAR season, the racing season year can be divided into two separate sub-seasons with race 1-18 in the first half sub-season and races 19-36 in the second half sub-season. Real competitor selections can be made by fantasy sports participants either by driver name or by car number. Car numbers can be used to account for different drivers sometimes being used in the same car.

The car number effectively represents a NASCAR "team" including the pit crew, drivers that drive for that team, etc. Using the car number also allows for a fantasy sports participant to receive points even if a driver is replaced because of injury or any other reason. Each fantasy sports participant may choose a specific car or driver only one time in each 18-race sub-season. Each fantasy sports participant receives points for the position in which the car selected for a given race finishes. For example, a fantasy sports participant who picks Jeff Gordon, car #24 receives one point if car #24 finishes first in that race. If the #24 car finishes thirtieth in a race, all fantasy sports participants who selected car #24 for that race would receive thirty points.

Splitting the real-sports season into more than one sub-season can also be useful in team sports in which the number of teams in the real sports league upon which the fantasy sports league is based has fewer real teams than there are scoring periods in the fantasy sports season. For example, a fantasy sports league based on a college basketball conference such as the Pac-10 might have 15 or 16 one-week scoring periods in which each team plays one or two games per week. As there are only 10 teams in the Pac-10 conference, the fantasy sports season can be broken into a first half pool and a second half pool.

Fantasy sports participants start with an available player pool at the beginning of the regular season and use players according to the roster requirements with players used in a scoring period being unavailable for use in later scoring periods. At the mid-point of the regular season, the available player pools can be reset to their starting condition for each fantasy sports participant and fantasy league play resumes in the second half of the season as in the first half of the season. A real player can be used once or many times by each fantasy sports participant in each of the first half and the second half of the real sports season. More than two sub-seasons can also be used if desired.

Grouping of games played by real teams in the real sports league upon which the fantasy sports league is based into game periods can be used as well to ensure that sufficient real players are available for all of the game periods in the fantasy sports season. For example, the number of game periods, GP, can be set using the relationship $GP \leq RT \times RPPT$, where RT is a number of real teams in the team sport, and RPPT is a number of real players per real team who play the first sports position during a game of the real sport.

In some variations, a real player can be added to the available player pool after the start of the season. This could occur if a real player that was injured prior to the start of the season and was placed on the disabled list or was otherwise designated as unavailable can return to play during the ongoing season. Real players who become injured or inactive during the course of the season may be replaced.

A fantasy sports game according to the current subject matter can be commercialized by offering league hosting via the internet. A league website can be accessed by fantasy sports participants in the league to allow each fantasy sports participant to select his or her active roster for each week. The website serves as a front end to a database that tracks the available player pool of reach fantasy sports participant in the league and also tabulates scores for each fantasy sports participant based on the performance of the real players used in the active roster of the fantasy sports participant.

A fantasy sports participant can pay a fee to use the website and to join the league. In some implementations, monetary or other prizes can be awarded based on the standings of fantasy sports participants in the league at the end of the fantasy league season. Prizes can vary in size depending on the fee collected from each fantasy sports participant who participates in the league and/or on the number of fantasy sports participants in the league. Virtual reality may be utilized to provide the participants with a look and feel that is real and inviting and promotes user interaction with virtual players in a meaningful way, making the participants feel they are integrated into the team as a player, an owner or a team coach or captain.

In accordance with certain embodiments, the number of available players may be limited such that a fantasy sports participant cannot choose from the full roster of all players in the league. Instead, the selection may be from a limited group of players for each role (e.g., top 25 quarterbacks, top 50 running backs, top 70 wide receivers, etc.). This forces the participant to select players that will be playing as opposed to picking players that do not play at all. In one embodiment, if the participant's selected player does not play at all, the participant is awarded additional points (if the goal is the lowest score) or penalized (if the goal is the highest score). Thus, selecting injured or non-playing players is risky—if the player plays very little that would be good for the participant, but if the player does not play at all, it would be bad for the participant.

In the alternative, rather than limiting the number of available players, all players in the league may be available for selection, but the salary for certain individuals or groups of players that are expected to not play, injured, or play very little, may be increased to an exorbitant amount. In this manner, if a fantasy sports participant wishes to select a very expensive player, then the participant may not be able to have a complete fantasy team because the salary cap would be quickly exhausted. The determination about the limitations on players' availability and salary may be based on player statistics, at random, or some other rule or criteria. For example, the limitations may be based on points per season to date, or based on a prediction or projection about the historic player performance, matchups, weather, a proprietary projection algorithm for picking worst of the best, or worst of the worst, or best of the worst players, as limited based on the salary cap for the team.

In some embodiments, instead of selecting a full roster of players for the team, the participant may be able to select a team with a partial roster of players. In one example, the participants may choose to pick a team that includes only two quarterbacks and two wide receivers. In this example, multiple participants may compete against each other based on picking partial rosters, as long as the partial rosters correspond to each other in the player positions. In other words, two participants that have selected teams with similar or same roster lineups can compete. In such scenario, the players on the roster each will receive points based on their performance and the worst scoring roster will win. If a player does not play, then the participant may receive a bonus negative score that makes it harder for the participant to win.

In accordance with certain aspects, when it is doubtful that a player may be playing in future games, or when a player is injured, that player may be excluded from the selection lineup or from a team's roster, if already selected. Alternatively, instead of excluding injured players, the players that are injured may be assigned higher salaries. For example, if it is doubtful a player can play in a game, then the player's salary may be increased to twice the player's normal salary. If it becomes clear that the player is going to be out, the player's salary may be increased to three times the normal designated salary, and so on. In this manner, a participant will need to pay more for players, when it is questionable whether those players will be able to play. Questionable players may be excluded until certain amount of time prior to the game, when there is more certainty about their availability or injury status.

The above limitations are provided with the intention to encourage a participant to select and lock-in a team lineup of players that play, but perform poorly, as early as possible prior to the game scheduled start date. In some embodiments, the participant is provided with the opportunity to update their team selection and lineup at certain intervals prior to the game. For example, if a player selected by a participant is identified as being injured and unable to play, the participant may get a notification that salary requirements for that selected player has changed (e.g., due to an injury) and that because of that the selected roster's salary cap has been exceeded. The participant may then be given an opportunity to replace the injured player in order to be able to continue to participate within the allowed salary cap. If the participant does not select a replacement player, the system could automatically assign the participant a replacement player or alternatively, the participant's team is deemed invalid. In certain aspects, a participant may be able to purchase the option to increase the salary cap for the selected team so that the participant can maintain the original team roster, despite the injured player being on the team.

In some embodiments, a participant may be penalized if he selects a roster in which one or more of the players do not play at least in some portion of the game or do not perform (e.g., fail to pitch, fail to have an at bat, fail to throw a pass, or fail to play at least one minute of the game, etc.). This penalizing feature is to discourage participants from selecting a player who is not likely to play or has a or a small chance of playing. Incentives may be also provided to encourage participants to select players that have a good chance of playing a significant portion of the game, but are bad performers. In some aspects, a participant may select a prospective lineup days before the start of the game and be given a chance to update the prospective lineup after an injury report is released to ensure the selected team remains below the imposed salary cap.

In one or more embodiments, no salary cap is imposed and the participant may choose a roster freely from players that have an expected performance projection. A winner may be selected from among the participating teams based on the spread calculated in relation to the actual performance of the real players that form the fantasy sports team, after the game, versus the expected performance of the same players, at the time the participant selected or locked the game roster. The team with the bigger spread in projected points wins. Bonus points may be awarded or deducted according to how bad a team performs.

In one aspect, the participant may also be given the option to choose one or more players with the expectation that the one or more players would not perform a certain act during a game for several games. For example, the participant may select a player in a baseball game with the expectation that the player will not hit a home run, or select a player in a football game that will not score a touchdown, or select a team that will score the least points of the week or be at the bottom of the score charts, game after game, or week after week. As long as the participant's selected player or team continues to underperform as selected, the participant stays in the game. In one example, if the participant beats a record (i.e., a streak), the participant wins a prize from the pool of money contributed by the other participants. In some aspects, a participant may drop a selected player from the roster by paying a fee, which goes into a pool from which the winners are paid.

In certain embodiments, season-long games may be provided where the participants may play regular fantasy games and also pick the team in their league each week that they think is going to underperform the most compared to predicted scores. At the end of the season, the fantasy participant who predicted the most weekly worst rosters can win an additional reward. During a season-long league, participants may be rewarded with free credits to play daily or weekly games with options to drop out or paying to continue.

Tiered game options may be also provided in accordance with one or more embodiments. For example, one or more participants may be offered the top tier players in the league (e.g., the top five quarterbacks, the top 10 wide receivers, etc.) and pick one of each type of player. In some embodiments, the participants may select a number of players from multiple tiers to fill his team roster. Some of the players may be selected from tier one, some from tier two, some from tier three and so on, where the players on a higher team are more expensive. Some participants may pick a player from all tiers offered. Other participants may pick a player from certain tiers only. For example, a participant may pick three quarterbacks from tier one, and another participant may select a different combination of players from tiers one through three.

In some embodiments, group competitions may be offered so that a first team of participants can pick a first roster of players. The selected roster by the first team of participants may then compete against a second team of participants picking a second roster of players. In some implementations, each group may pick multiple rosters. In such scenario, the cumulative score of the rosters may be used to determine the winning team. In some embodiments, the participants in the team may be able to see the players in each team. Fantasy sports cross-pollination options may be also provided where, as an example, a participant picks the worst performing players across different sports teams (e.g., the selected roster is made up of a football team's quarterback, a basketball teams' point guard, and an NHL's goalie).

In one or more example embodiments, games may be offered where, as an example, there are 100 participants for Thursday games, and the top 50 can be awarded a prize depending on their picks. Instead of accepting the prize, a winning participant may choose to let his winnings continue to be invested to the next game (e.g., Sunday's early games) when the top 10 can cash out. Alternatively, the winner of the next game can let his winnings continue to ride until Sunday's late games, Sunday's evening game, or the Monday game, where the final winner is determined. In this manner, the player picks for the Thursday game advance to the Sunday game, and then to the Monday game as the participant continues to win. In some embodiments, the participant may be given the option to update the selected player on his roster between games (e.g., after each win).

Accordingly, the sports fantasy participants may engage in a loser bracket style play, such that the participants that do not win are dropped and the winning participants continue to play against the remaining winning participants, until a final participants remains as the winning participant. Depending on implementation, the participants may be given the option to switch to a new lineup after one or more wins. Text messaging or other notification mechanism may be used to let the participants know about their winning or losing status and whether spots are available in future contests.

In one or more embodiments, virtual reality augmentations and features may be implemented to allow participants to more interactively participate in a virtualized fantasy sports environment. For example, a fantasy sports virtual lobby may be provided where a participant can pick his initial lineup from virtual reality avatars of players present in the virtual lobby. After the selection, the participant may review the selected roster of players and be given the option to switch or lock a player by way of a virtual reality graphical user interface. The virtual lobby may be also configured to offer some or all participants in virtual attendance with certain benefits.

For example, some areas of the virtual lobby may provide a participant with live or pre-recorded programs broadcasted by sports fans or well-known sports individuals, players or experts. In some areas of the virtual environment, graphical interfaces similar to scrolling statistic boards may be displayed. These boards may, for example, include a list of players who have underperformed or may underperform as predicted based on an algorithm or one or more expert opinions. In certain areas of the virtual lobby, individualized, private or public group studios or screening areas may be provided for likeminded virtual participants to gather and watch live games. Some of these virtual settings may be either open to all participants or restricted where entry is by invitation or open to VIP participants only.

Figure 4:
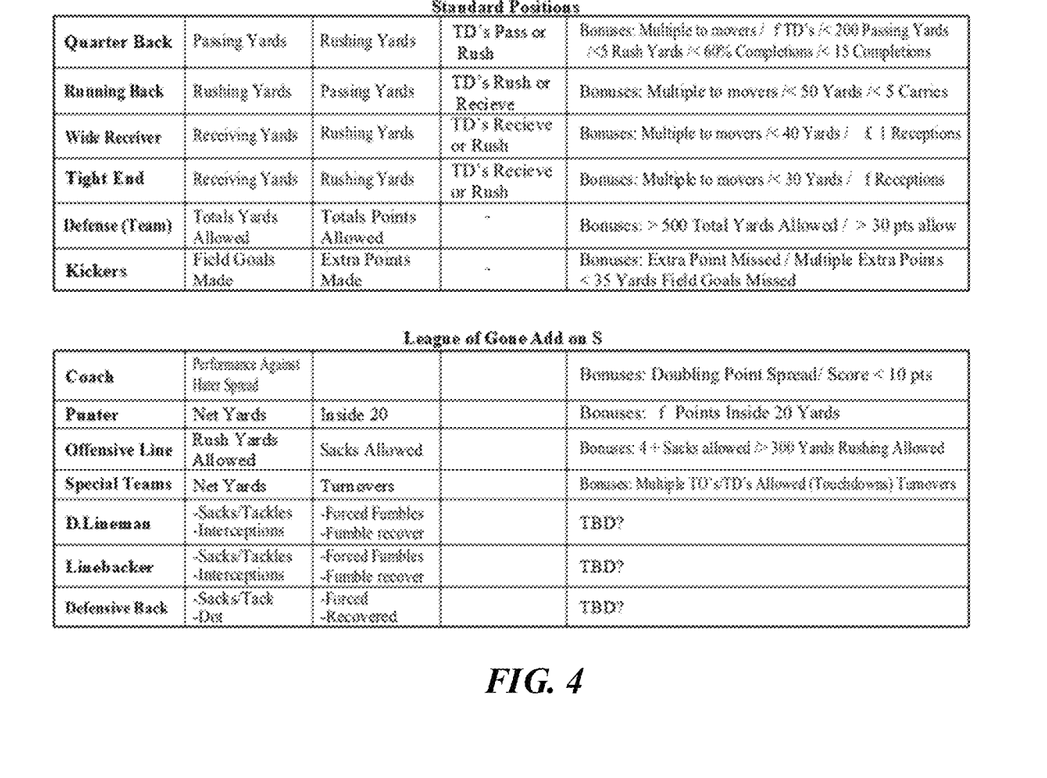
FIGS. 4 through 6 are example tables and user interfaces which may be used to select real players, according to an implementation of the current subject matter.
Figure 5:
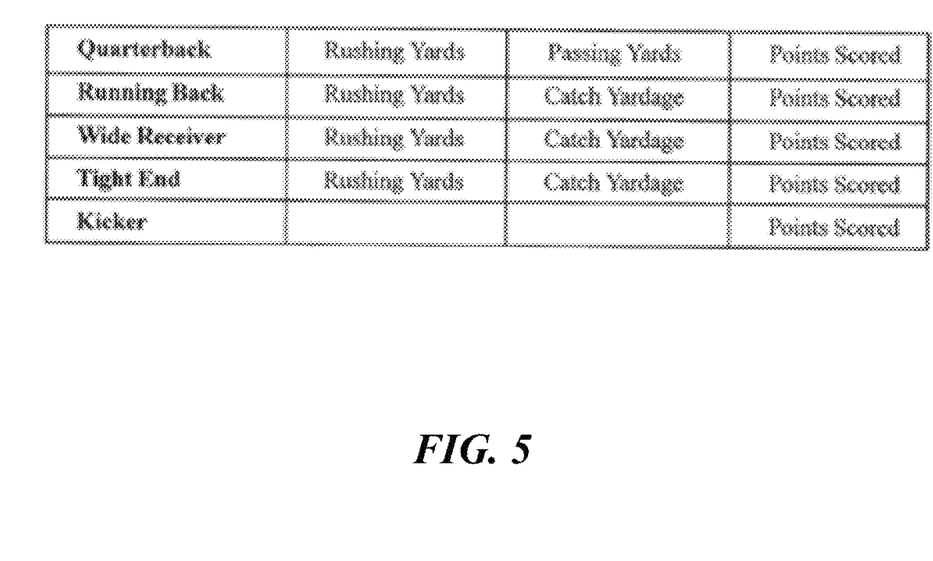
Figure 6:
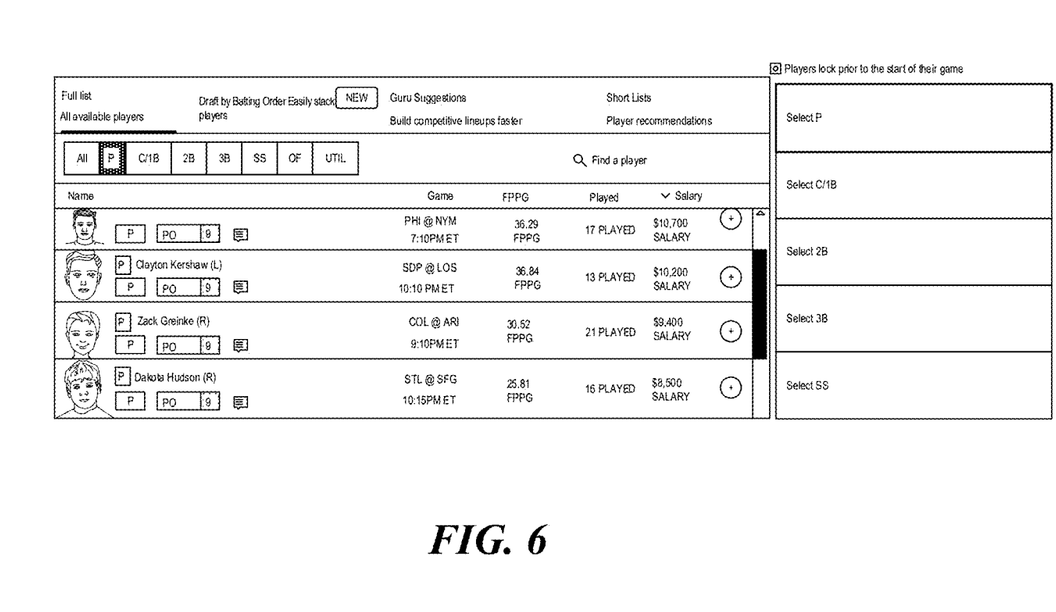

Referring to FIGS. 4 through 6, in various implementations, online, real time scoring can be provided via a user interface displayed on a user computer that accesses one or more central servers over a network such as the Internet. As shown in FIGS. 4 and 5, statistics reflecting performance of real players in the league, conference, etc. upon which the fantasy league is based can be obtained in real time, for example, from a commercial service that provides such statistics and converted to the scoring or ranking system used by the fantasy league to generate real time scoring. FIG. 6 illustrates a graphical user interface that allows a user select from a list of players and add the players to the fantasy league roster.

The user interface can in some implementations be a web portal or web page that uses JavaScript, Adobe flash or one or more other executable languages or media presentation packages to display real player statistics for players on the fantasy sports participant's current active roster and/or on the rosters of other fantasy sports participants, current scoring period scoring for the fantasy sports participant and/or other fantasy sports participants, total season scoring for the fantasy sports participant and/or other fantasy sports participants, and the like.

Figure 7:
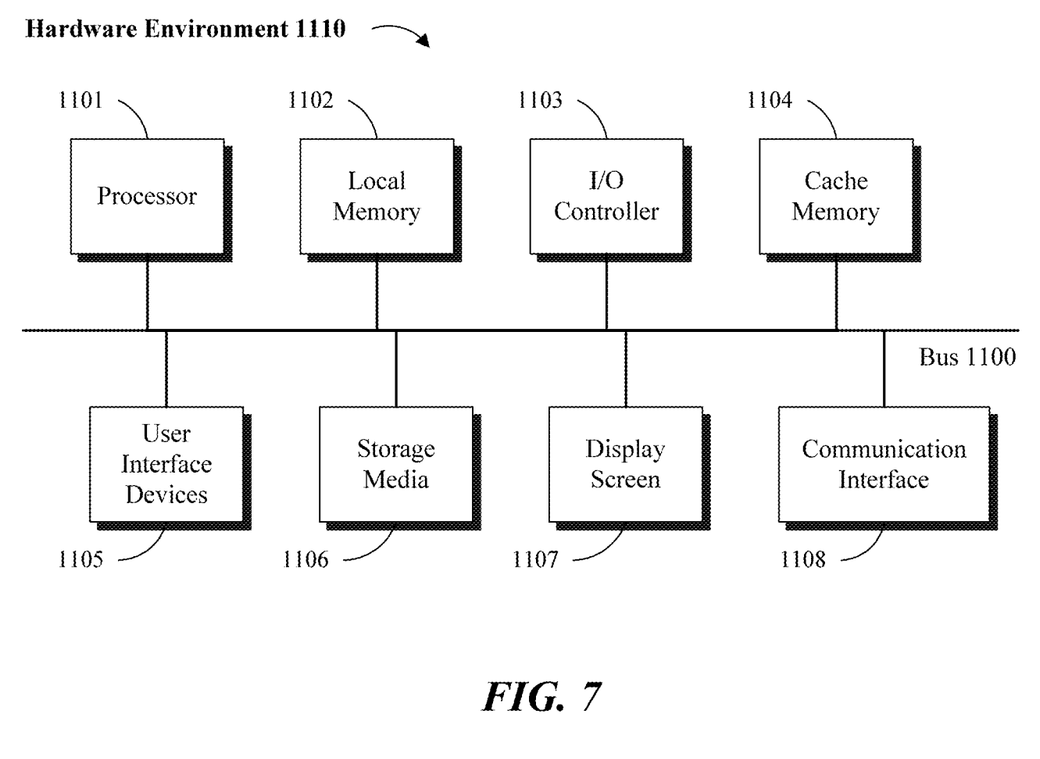
FIG. 7 is a block diagram of an example computing system that may be utilized to perform one or more computing operations or processes as consistent with one or more disclosed features.

Referring to FIG. 7 a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 7, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. For example, the methodologies and embodiments disclosed herein may be applied to organizing contests and awarding prizes to participants that engage in picking any roster of players or items that can have a perceived value that fluctuates overtime based on changes in statistical or data analysis. In some examples, methodologies and systems disclosed herein may be applied to reward participants who pick a roster of best or worst performing stocks (i.e., equities in public or private corporations listed on one or more financial stock exchanges). These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent documents or the patent disclosure, as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method comprising:
receiving a selection of choices through an interactive graphical user interface configured to provide one or more graphically selectable elements on a display communicatively coupled to a computing system, wherein:
selecting a first graphical element displays a first list of available to select virtual players associated with a first sports position in a team sport, and
selecting a second graphical element displays a second list of available to select virtual players associated with a second sports position in the team sport,
the first list and the second list including salary information, for at least one or more virtual players listed in the first list and the second list, based on which salary information a total salary for a roster of players in a virtual team is calculated,
in response to determining that a first real-life player associated with the first virtual player in the first list is injured, updating salary information associated with the first virtual player to exceed a first amount and recalculating the total salary for the roster to determine whether the total salary for the roster is above a predetermined threshold;
the selection of choices submitted by a user participant in a fantasy sports game in association with a first game period scheduled according to a real-life sports game period, the selection of choices resulting in the virtual team including one or more virtual players selected for a game roster from among a plurality of virtual players, the plurality of virtual players being respectively associated with a plurality of real-life players included in a pool of players participating in real-life sports games during the first game period;
assigning performance ratings to the selected virtual players based on statistical analysis of performance data available for the corresponding real-life players during the first game period;
computing a total score for the user based on the assigned performance ratings for the selected virtual players for the duration of the first game period, wherein the computing of the total score comprises:
adjusting the total score based on critical factors selected by the participating user, the critical factors being selected during the first game period and being related to performance of a coach assigned to the virtual team by the participating user and performance of one or more virtual players selected by the participating user to be included in the virtual team; and
adjusting the total score based on real-time events associated with the real-time players associated with the virtual players, wherein the real-time events include at least one of penalties, injuries, bad plays, or miscues associated with the corresponding real-life players; and
rewarding the user with proceeds collected from a plurality of other users participating in the game, in response to determining that the computed total score for the user indicates that the user's roster of virtual players was one of the worst performers from among other users' rosters of virtual players.

2. The method of claim 1, wherein the pool of players participating in the real-life sports games during the first game period includes a number of real-life players who play a first sports position in a team sport upon which the first game period is based.

3. The method of claim 1, wherein one or more virtual players associated with one or more of the real-life players who are injured or unable to play may not be selected by the user as a part of the game roster.

4. The method of claim 1, wherein the critical factors include association of the corresponding real-life players with a real-life coach being identified as a sub-optimal performer, or a number of missed points by the corresponding real-life players.

5. The method of claim 1, wherein in response to determining that a first user has a tied score with a second user, a tiebreaker procedure is invoked.

6. The method of claim 5, wherein the tiebreaker procedure comprises rewarding the first user and the second user with an amount equal to the average value of the sum of a first ranking reward and a second ranking reward.

7. The method of claim 1, wherein the user is allocated a maximum salary amount when selecting the one or more virtual players for the game roster, such that sum of salaries associated with the selected virtual players is less than or equal to the maximum salary amount.

8. A computer-implemented game system comprising:
at least one programmable processor; and
a non-transitory machine-readable medium storing instructions that, when executed by the at least one programmable processor, cause the at least one programmable processor to perform operations comprising:
receiving a selection of choices through an interactive graphical user interface configured to provide one or more graphically selectable elements on a display communicatively coupled to a computing system, wherein:
selecting a first graphical element displays a first list of available to select virtual players associated with a first sports position in a team sport, and
selecting a second graphical element displays a second list of available to select virtual players associated with a second sports position in the team sport,
the first list and the second list including salary information, for at least one or more virtual players listed in the first list and the second list, based on which salary information a total salary for a roster of players in a virtual team is calculated, in response to determining that a first real-life player associated with the first virtual player in the first list is injured, updating salary information associated with the first virtual player to exceed a first amount and recalculating the total salary for the roster to determine whether the total salary for the roster is above a predetermined threshold;

the selection of choices submitted by a user in association with a first game period scheduled according to a real-life sports game period, the selection of choices including one or more virtual players selected for a game roster from among a plurality of virtual players, the plurality of virtual players being respectively associate with a plurality of real-life players included in a pool of players participating in real-life sports games during the first game period;

assigning performance ratings to the selected virtual players based on statistical analysis of performance data available for the corresponding real-life players during the first game period;

computing a total score for the user based on the assigned performance ratings for the selected virtual players for the duration of the first game period, wherein the computing of the total score comprises:
  adjusting the total score based on critical factors selected by the user; and
  adjusting the total score based on real-time events associated with the real-time players, the real-time events include at least one of penalties, injuries, bad plays, or miscues associated with the corresponding real-life players; and rewarding the user with proceeds collected from a plurality of other users participating in the game, in response to determining that the computed total score for the user indicates that the user's roster of virtual players was the worst performer from among other users' rosters of virtual players.

9. The game system of claim 8, wherein the pool of players participating in the real-life sports games during the first game period includes a number of real-life players who play a first sports position in a team sport upon which the first game period is based.

10. The game system of claim 8, wherein the number of real-life players is greater than a total number of game periods in a game season.

11. A computer program product comprising a non-transitory machine-readable medium storing instructions that, when executed by at least one programmable processor, cause the at least one programmable processor to perform operations comprising:
  receiving a selection of choices through an interactive graphical user interface configured to provide one or more graphically selectable elements on a display communicatively coupled to a computing system, wherein:
    selecting a first graphical element displays a first list of available to select virtual players associated with a first sports position in a team sport, and
    selecting a second graphical element displays a second list of available to select virtual players associated with a second sports position in the team sport,
  the first list and the second list including salary information, for at least one or more virtual players listed in the first list and the second list, based on which salary information a total salary for a roster of players in a virtual team is calculated, in response to determining that a first real-life player associated with the first virtual player in the first list is injured, updating salary information associated with the first virtual player to exceed a first amount and recalculating the total salary for the roster to determine whether the total salary for the roster is above a predetermined threshold;

the selection of choices submitted by a user in association with a first game period scheduled according to a real-life sports game period, the selection of choices including one or more virtual players selected for a game roster from among a plurality of virtual players, the plurality of virtual players being respectively associate with a plurality of real-life players included in a pool of players participating in real-life sports games during the first game period;

assigning performance ratings to the selected virtual players based on statistical analysis of performance data available for the corresponding real-life players during the first game period;

computing a total score for the user based on the assigned performance ratings for the selected virtual players for the duration of the first game period, wherein the computing of the total score comprises:
  adjusting the total score based on critical factors selected by the user; and
  adjusting the total score based on real-time events associated with the real-time players, elimination of a real-time player from a game favorably affecting the user's score, in response to determining that the user's roster included a virtual player associated with the eliminated real-time player; and rewarding the user with proceeds collected from a plurality of other users participating in the game, in response to determining that the computed total score for the user indicates that the user's roster of virtual players was the worst performer from among other users' rosters of virtual players, the user competing with the other users participating in the game based on selection of corresponding partial rosters by the user and at least one other user from among the other participating users.

12. The computer program product of claim 11, wherein the pool of players participating in the real-life sports games during the first game period includes a number of real-life players who play a first sports position in a team sport upon which the first game period is based.

13. The computer program product of claim 11, wherein the number of real-life players is greater than a total number of game periods in a game season.

\* \* \* \* \*